United States Patent
Ollikainen et al.

(10) Patent No.: US 7,109,923 B2
(45) Date of Patent: Sep. 19, 2006

(54) DIVERSITY ANTENNA ARRANGEMENT

(75) Inventors: Jani Ollikainen, Helsinki (FI);
Clemens Icheln, Espoo (FI); Pertti Vainikainen, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/785,375

(22) Filed: Feb. 23, 2004

(65) Prior Publication Data

US 2005/0184914 A1    Aug. 25, 2005

(51) Int. Cl.
*H01Q 1/38* (2006.01)

(52) U.S. Cl. ............... 343/700 MS; 343/702

(58) Field of Classification Search ......... 343/700 MS, 343/702, 846, 850, 860, 815, 833, 834
See application file for complete search history.

(56) References Cited

U.S. PATENT DOCUMENTS

| | | | |
|---|---|---|---|
| 5,420,599 A * | 5/1995 | Erkocevic | 343/828 |
| 6,255,994 B1 * | 7/2001 | Saito | 343/700 MS |
| 6,476,769 B1 * | 11/2002 | Lehtola | 343/702 |
| 6,657,595 B1 * | 12/2003 | Phillips et al. | 343/702 |
| 6,683,575 B1 * | 1/2004 | Sekine et al. | 343/702 |
| 6,768,460 B1 * | 7/2004 | Hoashi et al. | 343/700 MS |
| 6,801,168 B1 * | 10/2004 | Yeh | 343/700 MS |
| 2002/0057227 A1 | 5/2002 | Fang | 343/895 |
| 2002/0140612 A1 | 10/2002 | Kadambi et al. | 343/702 |

FOREIGN PATENT DOCUMENTS

WO     WO 0113461     2/2001

* cited by examiner

*Primary Examiner*—Tan Ho
(74) *Attorney, Agent, or Firm*—Alfred A. Fressola; Ware, Fressola, Van Der Sluys & Adolphson LLP

(57) ABSTRACT

There is provided a method of operating, a diversity antenna system and arrangement for a mobile station such as mobile phone having a general ground element, the diversity antenna arrangement including at least a pair of antenna elements. Each antenna element comprises a generally L-shaped radiating element, and a conductive leg portion being operatively coupled to the generally L-shaped radiating element.

37 Claims, 12 Drawing Sheets

600    601

603    604

DIVERSITY ANTENNA ARRANGEMENT

TECHNICAL FIELD OF THE INVENTION

The present invention relates to antennas, and more particularly to diversity antennas.

BACKGROUND OF THE INVENTION

In the simplest definition of the term, the diversity technique in the design of an antenna is a means of achieving reliable overall system performance through the use of an additional antenna. System performance may be characterized by signal strength, signal to noise ratio, data rate, error rate, or other factors. Of particular importance to wireless data systems is to achieve high data rates with low error rates.

In wireless or radio communications, particularly in mobile radio communications, antenna diversity is a well-known technique for mitigating fast fading caused by multipath signal propagation. In order to obtain diversity gain, at least two signals carrying the same information but with different fading characteristics (low signal correlation) are needed. Polarization diversity, which is one of the commonly used diversity techniques, utilizes the independent fading of vertically and horizontally polarized signal components. It is a potential technique for handsets, because large antenna separations are not required.

Thus, it is known that not only phase changes but polarization changes take place in a multipath signal environment, and therefore polarization diversity has been utilized to further improve the rate of data transfer in cluttered environments. Polarization diversity means the use of two antennas oriented such that in areas where antenna one has higher gain in one polarization, antenna two has higher gain in the orthogonal polarization. In general, polarization diversity is achieved by two antennas having orientation such that the polarization axes are approximately orthogonal. Furthermore, the main beams of the antennas can point to different directions and the antennas can be spaced some distance apart, in which case also angle and space diversities are utilized to decorrelate the signals. Again, by suitable signal processing, the average signal to noise ratio can be increased using polarization diversity compared to a single antenna system, as well as increased average signal to noise ratio compared to, for example, spatial diversity antenna systems.

One approach has used a planar inverted F antenna (PIFA) as an antenna applied in the polarization diversity technique. FIG. 1 depicts two square-shaped planar inverted-F antennas (100) (PIFAs or alternatively referred to as short-circuited patch antennas) positioned and fed as in FIG. 1 by a feed probe (104) and short circuit (105). The antennas (100) can be used to obtain good diversity gain (5–9 dB) in a personal mobile communication terminal (PMCT). This has been confirmed with radio channel sounder measurements. The size of a ground plane (103) is approximately 40 mm×100 mm (width×length). The size of antenna elements (101, 102) is approximately 16 mm×16 mm×7 mm (length×width×height).

However, the wireless devices tend to be designed for being, possibly, comfortably carried by the user. This trend has driven a need for designing relatively small, light and handy wireless devices for users.

This has for one's part created new challenges for antenna design and technique. For an example, compared to the typical internal antennas currently used in small PMCTs, such as mobile phones, the PIFAs of FIG. 1 are clearly larger, possibly, too large for the mobile phone application.

In view of various inherent limitations of antennas and wireless communications devices, it would be desirable to avoid or mitigate these and other problems associated with prior art. Thus, there is a need for a technique to provide more compact diversity antenna arrangement.

SUMMARY OF THE INVENTION

Now a more compact diversity antenna arrangement has been invented that more suitably fits for a mobile station such as a mobile phone.

In accordance with aspects of the invention there is provided a method of operating, a diversity antenna system and arrangement for a mobile station having a general ground element, the diversity antenna arrangement including at least a pair of antenna elements. Each antenna element comprising:

a generally L-shaped radiating element; and a leg portion coupled to both the generally L-shaped radiating element, the leg portion containing a feed arrangement for feeding the antenna element against the ground element.

Some embodiments provide a more compact and lighter antenna solution for a cellular mobile phone. In some further embodiments, the weight of the antenna arrangement can be reduced over 30%. The compactness and the lighter weight have particular relevance because a trend of mobile phone design has driven the field even up to tiny hand-held mobile phones. In some further embodiments, the L-shaped radiating element may be replaced by a curved element(s) because of the structure and design of a chassis of the mobile. Thus the L-shaped antenna element can also have rounded corners or be of a semi-ellipsoidal form. The L-shaped antenna element can be planar, rounded, bendy shaped, curved, stacked etc. The ground element does not have to have a shape of a plane but can be adapted to the shape and design of the chassis and the mobile phone. Electrical characteristics of the embodiments can be reasonable and equivalent compared to more space requiring larger designs.

For better understanding of the present invention reference is made to the following description, taken in conjunction with the accompanying drawings.

BRIEF DESCRIPTION OF THE DRAWINGS

The invention will now be described, by way of examples only, with reference to the accompanying drawings, in which.

DETAILED DESCRIPTION OF THE EMBODIMENTS

Figure 1:
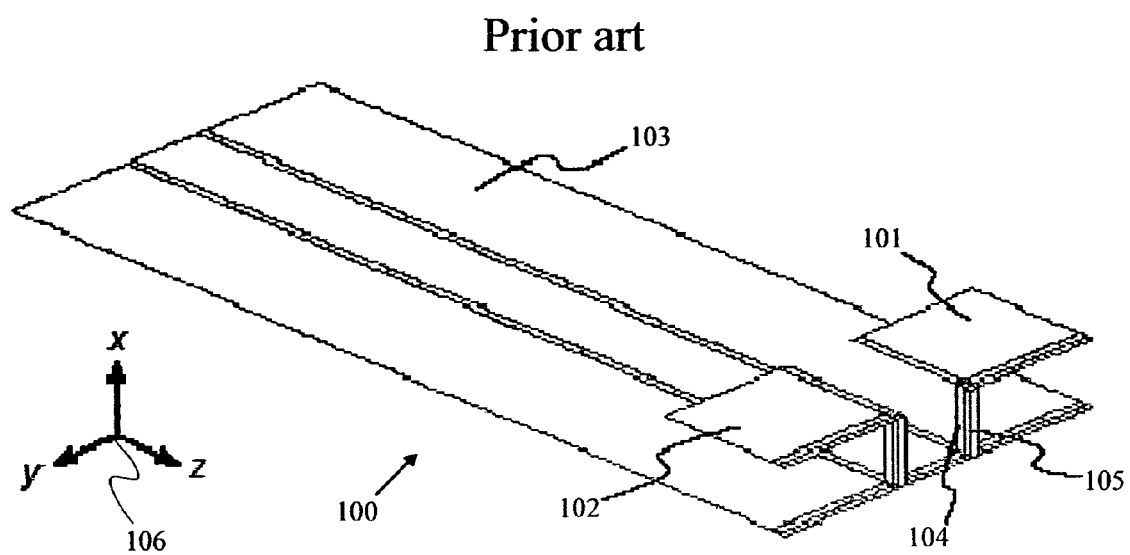
FIG. 1 depicts a known diversity antenna arrangement for a wireless terminal.

Some embodiments of the invention provide a diversity antenna arrangement for a mobile station having a general ground element. The diversity antenna arrangement includes at least a pair of antenna elements. Each antenna element comprises a first elongated conductive element. A conductive leg portion is coupled to the first elongated conductive element. The leg portion contains a feed, also known as a feed element or a feed arrangement, for feeding the antenna element against the ground element. Each antenna element has also a second elongated conductive element. The first and the second generally planar elongated conductive elements are transversal to each other and in contact with each other. In some further embodiments, the first and the second generally planar elongated conductive elements are perpendicular to each other. The first and the second generally planar elongated elements and the conductive leg portion are made from a unitary metal part in some embodiments; even some other portions of the antenna like the so-called short circuit element can be made of the same metal part. The appearance of the unitary metal part can generally form an L-shaped figure. In some further embodiments, the L-shaped radiating element may be replaced by a curved element(s) because of the structure and design of a chassis of the mobile. Thus the L-shaped antenna element can also have rounded corners or be of a semi-ellipsoidal form. The ground can be a plane or a theoretical plane. However, the ground does not have to have an exact shape of a plane but can be adapted to the shape and design of the chassis and the mobile phone. Preferably, the antenna elements can be considered more compact, smaller, and lighter making the antenna system suitable for cellular mobile phones. Advantageously, an open end of the antenna elements can be bent towards the ground plane making the antenna system even more compact. Also the antenna elements are situated quite far away from each other to minimize any coupling between the elements. The operation bandwidth of the antenna system can be widened by using, for example the stacked resonators structure.

Some embodiments of the invention apply a method of operating a mobile station for a mobile communications network. The mobile station has the pair of operational states and a general ground plane element. In the method a pair of antenna elements are provided. Each antenna element has a generally L-shaped radiating element, and a conductive leg portion coupled to the generally L-shaped radiating element. The leg portion contains a feed arrangement for feeding the antenna element against the ground element. The pair of antenna elements are aligned so that directions are substantially orthogonal. The antennas should be aligned so that the polarizations of the antennas are sufficiently different (i.e. substantially orthogonal) to provide low correlation between the signals received by the antennas. As later shown in for example the embodiment of by FIG. 6a, the polarizations of the antennas are orthogonal perhaps only in certain/some directions. They are, however, sufficiently different in most directions to provide low correlation between the signals received by the antennas. The mobile station is operated in a first operational state wherein in a given direction one of the pair of antenna elements is maximally responsive to a certain polarization, for example to a vertically or right hand circular polarization). The mobile station is also operated in a second operational state wherein in the same direction the other of the pair of antenna elements is maximally responsive to a polarization that is sufficiently different, for example even orthogonal perhaps, to that of the first antenna element (e.g. horizontal or left hand circular polarization). The polarizations of the antennas may depend on the direction. In practise, the polarizations may also depend on how the user holds the terminal. As long as the polarizations of the antennas are sufficiently different (or even perhaps orthogonal) in the directions wherefrom statistically significant parts of the signal at different polarizations arrive, the antennas can perform reasonably well.

In the following some theoretical study aspects and principles are described for the diversity antenna arrangement for the embodied invention.

Diversity gain depends on the envelope correlation ($\rho_e$) and the relative strengths of the signals coming from the diversity branches. Typically, the envelope correlation should be below 0.7 in order to obtain good diversity gain. For nearly maximal improvement, the average signal strengths of the diversity branches should be approximately equal.

One way to study the potential of a diversity antenna arrangement is to calculate the envelope correlation between the antenna elements based on their three-dimensional (3-D) complex radiation patterns. In a Rayleigh fading environment, the envelope correlation coefficient between two antennas referenced to the same coordinate system (here, standard spherical coordinate system) is given by the following equation:

$$\rho_e = \frac{\left|X \int_\Omega E_{1\theta} E_{2\theta}^* p_\theta d\Omega + \int_\Omega E_{1\phi} E_{2\phi}^* p_\phi d\Omega\right|^2}{\int_\Omega [X|E_{1\theta}|^2 p_\theta + |E_{1\phi}|^2 p_\phi] d\Omega \int_\Omega [X|E_{2\theta}|^2 p_\theta + |E_{2\phi}|^2 p_\phi] d\Omega}, \quad (1)$$

where $E_\theta$ and $E_\phi$ are the complex $\theta$ and $\phi$ components of the electric field radiated by the antenna, respectively; $p_\theta$ and $p_\phi$ are the angle of arrival probability distributions of the incoming $\theta$ and $\phi$ polarized plane waves; and X is the cross-polarization ratio $P_\theta/P_\phi$, where $P_\theta$ and $P_\phi$ are the powers received by $\theta$ and $\phi$ polarized isotropic antennas in a multipath environment, respectively. A simple model for the propagation environment can be obtained by assuming that signal power is equally distributed to both polarizations [X=1 (or 0 dB)] and that an equal amount of signal is arriving from all directions (Uniform distribution): $p_\theta = p_\phi = A$ so that $$\int_\Omega p_\theta d\Omega = \int_\Omega p_\phi d\Omega = 1. \quad (2)$$

A somewhat more realistic model is obtained by assuming an omnidirectional azimuth distribution and a Gaussian elevation distribution for the incoming power.

$$p(\theta) = A_1 \exp\left\{-\frac{[\theta - (90 - \theta_0)]^2}{2\sigma^2}\right\}, \theta \in [0,180] \quad (3)$$

In the above, $p(\theta)$ is either $p_\theta(\theta)$ or $p_\phi(\theta)$, denoting distributions of $\theta$ and $\phi$ polarized components, respectively. The parameters $\theta_0$ and $\sigma$ control the elevation angle of the peak and the spread of the distribution, respectively. The parameter $A_1$ is set so that the Equation (2) is satisfied. For example, the following values (for $p_\theta/p_\phi$) can be selected for some examples: $\theta_0=2.6°/3.6°$, $\sigma=5.0°/7.3°$, and X=9 dB. The values may represent measured averages to be applied in several environments.

Figure 2A:
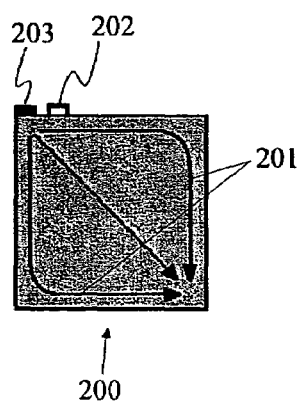
FIG. 2a depicts an example of a surface current flow on a square-shaped PIFA.
Figure 2B:
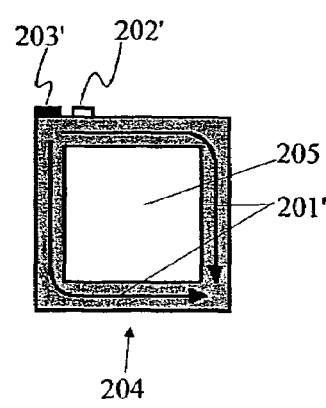
FIG. 2b depicts an example of a surface current flow on a square-shaped PIFA with metallization removed from the center in accordance with some principles of the embodied invention.
Figure 2C:
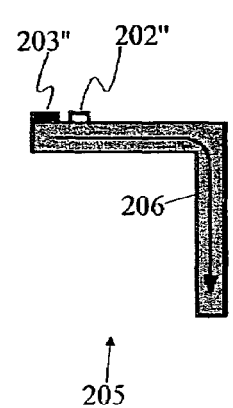
FIG. 2c depicts an example of a surface current flow on a remainder of the square-shaped PIFA with metallization removed from the center and with one of the symmetrical current paths removed in accordance with an embodiment of the invention.

In the FIGS. 2a, 2b, and 2c some basic theoretical principles are described for some embodiments of the invention.

Current flowing on a microstrip line is transversally highest on the edges of the line. This also applies to the microstrip type antennas, such as shorted patches or PIFAs. The current on a PIFA (200) is concentrated on the edges of the planar element as depicted in the example of FIG. 2a by current paths (201). The PIFA contains a feed (202) for a current and also a short circuit (203). It may be reasonably assumed that its radiation characteristics will not change significantly, if some of the metal is removed from its center.

This leaves two symmetrical current paths from the short circuit to the open end of the PIFA (204) of the example of FIG. 2b. In the PIFA (204) of FIG. 2b some of the metal is removed from substantial center region (205) of the PIFA (203). Both of these current paths (201') can be assumed to lead to fairly similar radiation and especially polarization characteristics.

Therefore, preferably, either one of the current paths (and the corresponding antenna metal part) can be removed as depicted in the example of FIG. 2c without affecting the radiation characteristics significantly. Conveniently, the antenna element (205) of the example of FIG. 2c has basically only one current path route (206). Advantageously, this makes the actual antenna considerably smaller and lighter, allows more flexibility for the more compact antenna and mobile terminal design, and may enable the use of such more compact antennas even in small PMCTs such as cellular mobile phones.

Figure 3:
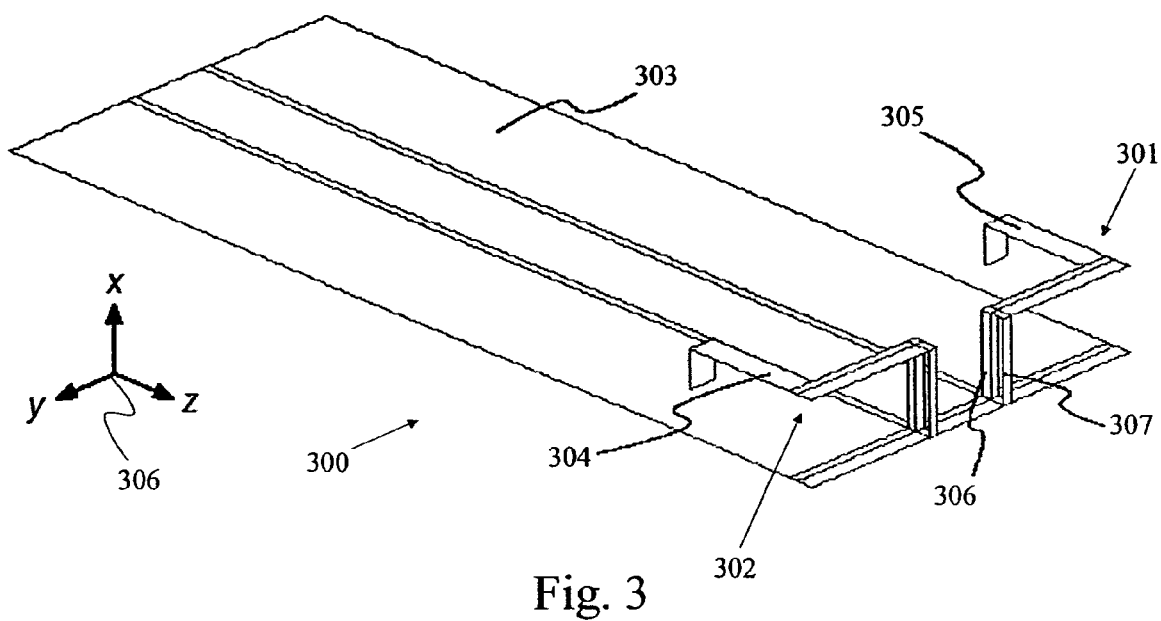
FIG. 3 depicts an example of a diversity antenna arrangement in accordance with an embodiment of the invention.

FIG. 3 shows an example of a diversity antenna arrangement according to an embodiment of the invention. A diversity antenna arrangement (300) contains two antenna elements (301,302). Two antenna elements (301,302) have been arranged to have nearly orthogonal polarizations in the x-axis direction. Preferably, two antenna elements (301,302) are similar to the one of the example of FIG. 2c. The compact diversity antenna arrangement (300) has a ground plane (303). Advantageously, the chassis of the mobile communication terminal (MCT) can act as the ground plane (303) either partly or completely. Preferably, the diversity antenna arrangement (300) can be a more compact solution. The antenna elements (301,302) have strips (304,305). The antenna elements (301,302) contain also a feed probe (306) and a short circuit (307) for the electric characteristics of the antennas. Embodied examples of the first and the second generally planar elongated conductive elements can be seen from the antenna element. Also the leg portion with the feeder and short circuit can be shown.

Advantageously, the open ends of the antenna elements (301,302) have been bent towards the ground plane (303) in some further embodiments (in yet some further embodiments perhaps towards the terminal chassis). Advantageously, this further reduces the antenna size. Moreover this kind of bending of the open ends of the antenna elements (301,302) towards the ground plane (303) does not deteriorate the radiation characteristics considerably.

Preferably, the open ends of the antenna elements (301, 302) are as far away from each other as possible to minimize coupling between the elements.

The size of the antenna element (301,302) can, for example, be approximately 15 mm×16 mm×8.5 mm (maximum length×maximum width×height). The strips (304,305) can be, for example, 3 mm wide. The size of the ground plane (303) can, for example, be 40 mm×100 mm (width× length).

Figure 4:
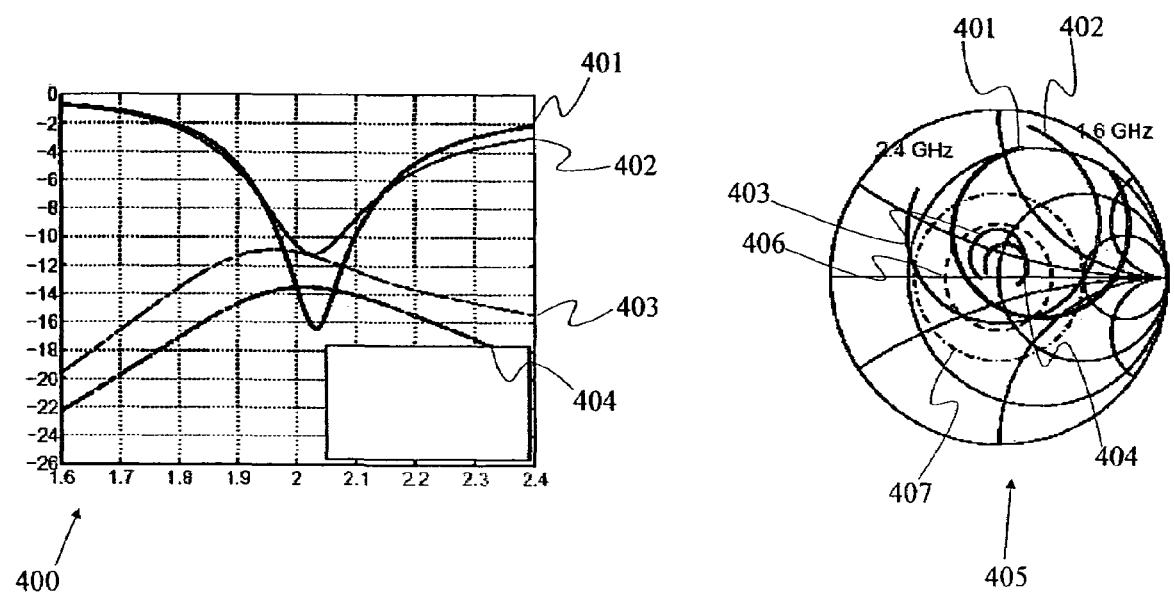
FIG. 4 illustrates simulated frequency responses of two port S-parameters for a diversity antenna arrangement according to the embodied invention and for the known diversity antenna arrangement of FIG. 1.

FIG. 4 illustrates simulated frequency responses of two port S-parameters for a diversity antenna arrangement according to the embodied invention and for the known diversity antenna arrangement of FIG. 1. Simulated reflection coefficients ($S_{11}$ and $S_{22}$) for the antenna elements and transmission coefficients ($S_{21}$ and $S_{12}$) between the elements are shown in the example of FIG. 4. The simulations can be performed, for example, with some commercially available Method of Moments (MoM) based full-wave electromagnetic simulator. A graph (400) has an x-axis denoting frequency in GHz units and y-axis denoting magnitudes of S parameters in dB units. The graph (400) contains a curve (401) illustrating $S_{11}$ and $S_{22}$ parameters for the embodied invention. A curve (402) illustrates $S_{11}$ and $S_{22}$ parameters for the known diversity antenna arrangement of FIG. 1. In addition, a curve (403) illustrates $S_{21}$ and $S_{12}$ parameters for the known diversity antenna arrangement of FIG. 1. A curve (404) illustrates $S_{21}$ and $S_{12}$ parameters for the embodied invention. A graph (405) illustrates a Smith's diagram for the corresponding curves. A circle (406) illustrates the S-parameter magnitude of −10 dB, whereas a circle (407) illustrates the S-parameter magnitude of −6 dB. Advantageously, compared to the known antenna arrangement of FIG. 1, the arrangement according to the embodied invention has a larger isolation between the antenna elements. This is mainly because the parts of the antenna containing sufficiently high electric fields to be significant enough from the isolation point of view are further away from each other. High isolation between the elements is desirable as it increases the total efficiency of the diversity antenna arrangement.

Figure 5:
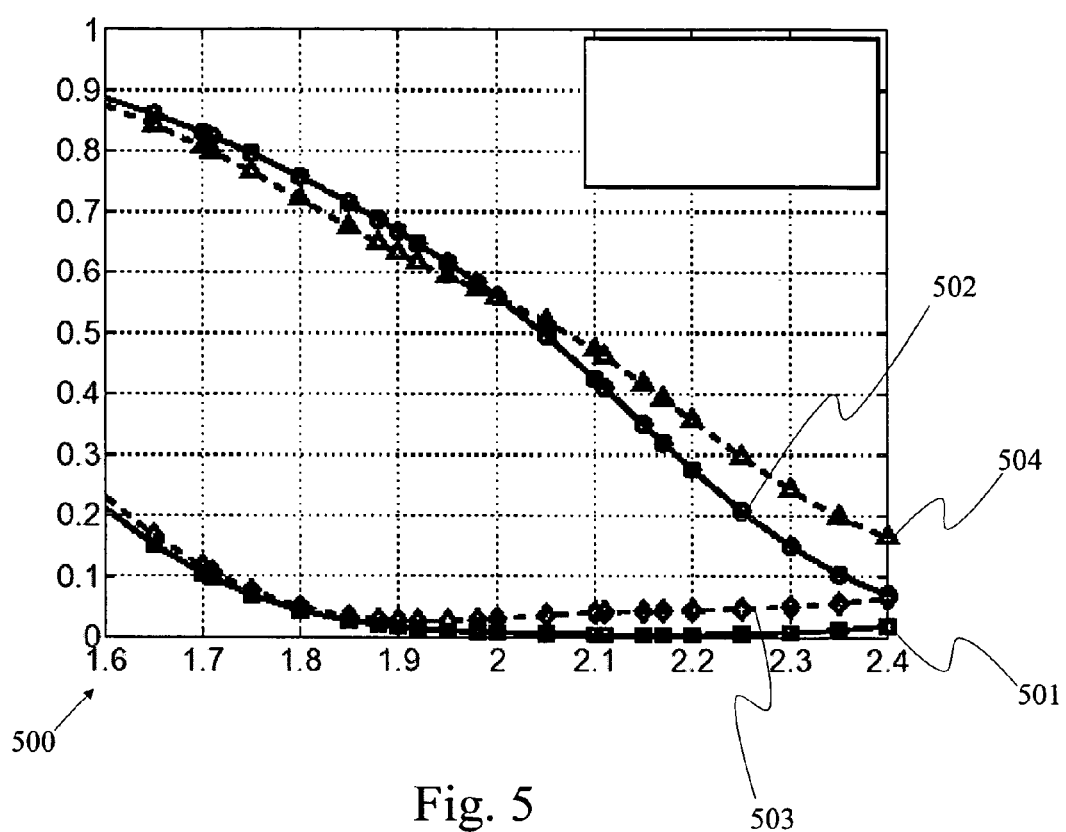
FIG. 5 illustrates calculated envelope correction coefficients for a diversity antenna arrangement according to the embodied invention and for the known diversity antenna arrangement of FIG. 1.

FIG. 5 illustrates calculated envelope correction coefficients for a diversity antenna arrangement according to the embodied invention and for the known diversity antenna arrangement of FIG. 1. The complex 3-D radiation patterns needed for the calculation were obtained with a commercially available MoM based simulation software. A graph (500) has x-axis denoting frequency in GHz units and y-axis denoting envelope correction coefficient $\rho_e$. A curve with boxes (501) in the graph (500) illustrates a Uniform distribution calculation for the embodied invention. A curve with circles (502) illustrates a Gaussian distribution calculation for the embodied invention. A curve with diamonds (503) illustrates a Uniform distribution for the known diversity antenna arrangement of FIG. 1. A curve with triangles (504) illustrates a Gaussian distribution for the known diversity antenna arrangement. With the Uniform distribution, both antennas have very low envelope correlations within the frequency range of interest (from 1.92 GHz to 2.17 GHz). With the Gaussian distribution, the envelope correlation increases but stays below 0.7 within the mentioned frequency range. The increase of correlation is largely due to the fairly high cross-polarization ratio (X=9 dB) used with the Gaussian distribution. The maximum correlation coefficient decreases from 0.7 to 0.1, as X is decreased from 9 dB to 0 dB. According to FIG. 5, both antennas are potentially suitable polarization diversity antennas, and should have similar diversity performance. Advantageously, the smaller and more handy embodied invention has substantially equivalent electrical antenna characteristics when compared to the larger antenna arrangement of FIG. 1.

Figure 6A:
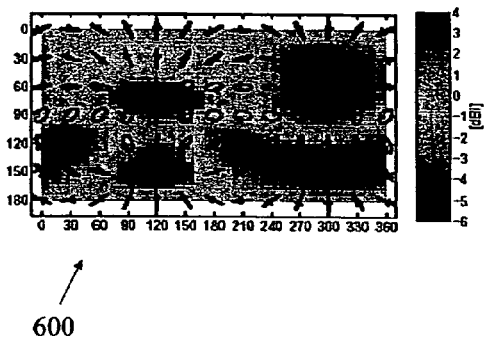
FIG. 6a illustrates simulated polarization ellipses and total realized gain for a diversity antenna arrangement according to the embodied invention.
Figure 6A:
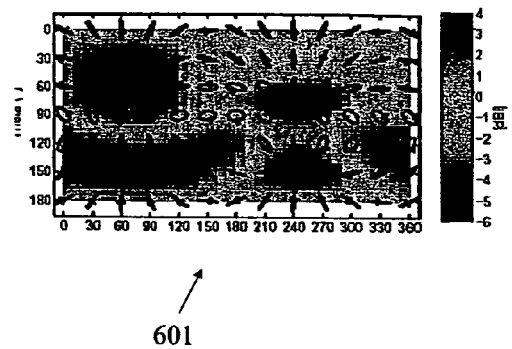
Figure 6B:
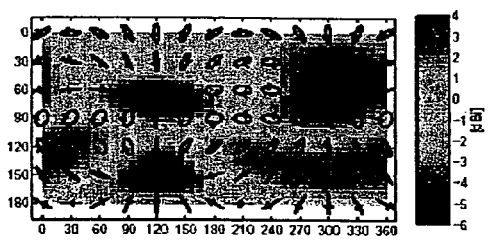
FIG. 6b illustrates simulated polarization ellipses and total realized gain for the known diversity antenna arrangement of FIG. 1.
Figure 6B:
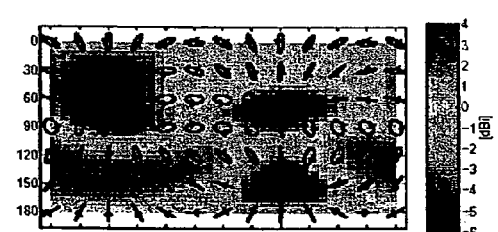

FIG. 6a illustrates simulated polarization ellipses and total realized gain for a diversity antenna arrangement according to the embodied invention. FIG. 6b illustrates simulated polarization ellipses and total realized gain for the known diversity antenna arrangement of FIG. 1. Thus FIGS. 6a and 6b show simulated polarization ellipses plotted on top of the total realized gain (realized $G_\theta+G_\phi$, including reflection loss) for the diversity antenna arrangements according to the embodied invention and that of FIG. 1, respectively. The applied frequency is 2.05 GHz. The patterns of FIG. 6a and FIG. 6b are nearly identical, which can further together with FIG. 5 illustrate and show that the proposed miniaturization of the antenna elements in the embodied invention has only a minor effect on the radiation characteristics. In the FIGS. 6a and 6b x-axes denote $\phi$ in degree units and y-axes denote $\theta$ in degree units in the standard spherical coordinate system used for antennas. The orientation of the antenna is given by the coordinate axes (306) in FIG. 3, where x-axes point to the direction $\theta=90°$ and $\phi=0°$, y-axes point the direction $\theta=90°$ and $\phi=90°$, and z-axes point to the direction $\theta=0°$ and $\phi=0°$ in the standard spherical coordinate system.

The reduction of the size of an antenna may decrease its bandwidth, which, therefore, can be an obvious downside. However, the decrease can be compensated.

Some embodiments of the invention apply a wide-band diversity antenna arrangement. The wide-band diversity antenna arrangement can be a more compact solution also. In the following some further technical details on the compact wider band diversity antenna arrangement are described.

Figure 7:
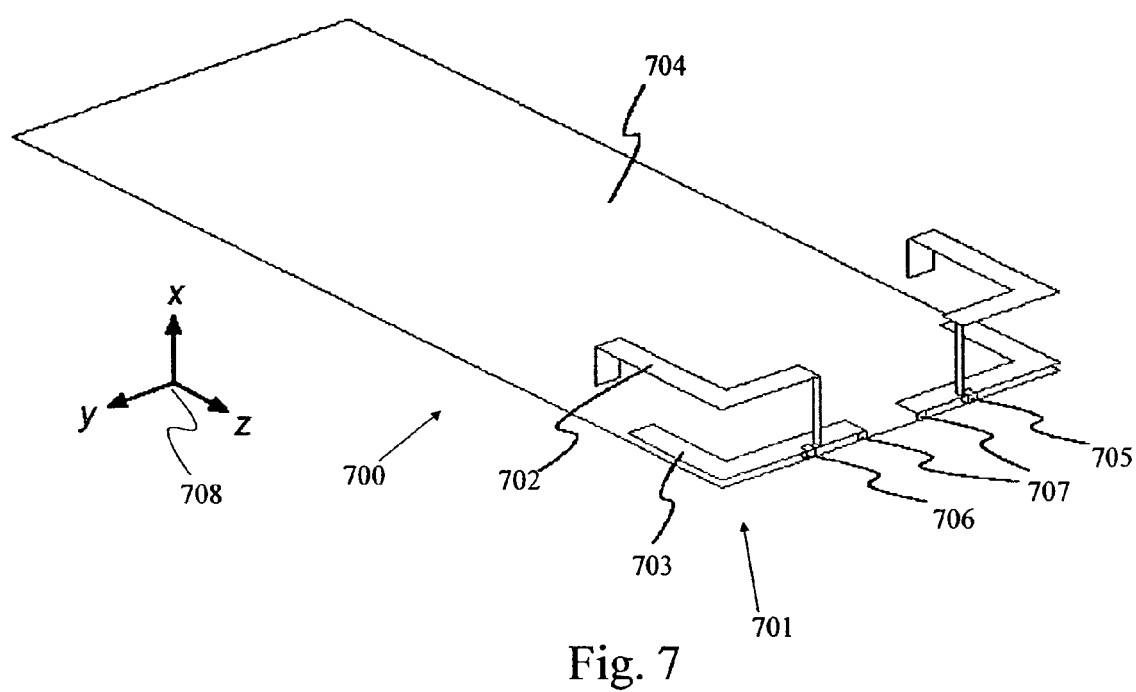
FIG. 7 depicts an example of a wide-band diversity antenna arrangement in accordance with a further embodiment of the invention.

FIG. 7 depicts an example of a wide-band diversity antenna arrangement (700) in accordance with a further embodiment of the invention. Preferably, the example of FIG. 7 may also be more compact approach for antenna design. The possible decrease of bandwidth caused by the antenna size reduction can be compensated by making the antenna dual-resonant or in yet some further embodiments multiresonant. The bandwidth of the example of FIG. 3 can be increased, for example, by using a stacked structure. It is also possible to use coplanar parasitics or a matching circuit comprising one or more high-Q resonators. The example of the wide-band diversity antenna arrangement comprises an antenna element(s) (701). The antenna arrangement contains a parasitic strip(s) (702). Advantageously, there is also a driven strip (703) in the antenna arrangement (700). Preferably, the driven strip (703) can act as a multiresonator with the strip (702) for widening the operation bandwidth of the antenna arrangement (700). The antenna arrangement (700) contain a chassis (704). The chassis can be either completely or partly a part of the mobile station such as a mobile phone. The antenna arrangement (700) has two ports (705,706) for RF signal feed/reception. Also the short circuits (707) are provided. In some further embodiments, the end of the strips (702) can be bent downwards towards the chassis (704), for example.

Still referring to some embodiments of FIG. 7, the exemplary size of one antenna element can be approximately 17 mm×18 mm×8 mm (maximum length×maximum width×height). The strips can be 3 mm wide. The size of the ground plane (704) can, for example, be 40 mm×100 mm (width×length).

Figure 8:
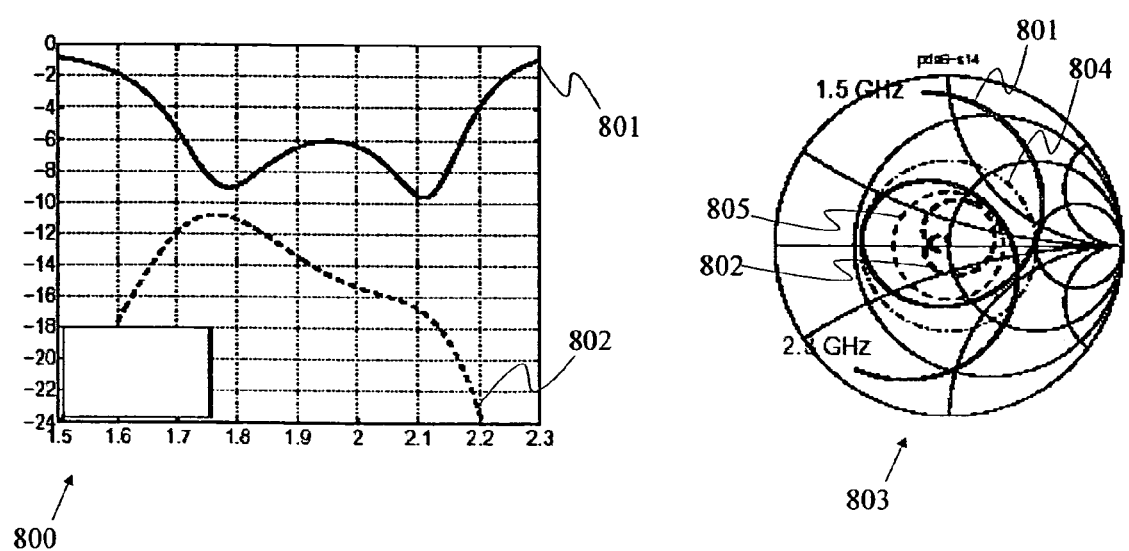
FIG. 8 illustrates an example of simulated frequency responses of two port S-parameters for a wide-band diversity antenna arrangement according to a further embodiment of the invention.

FIG. 8 illustrates an example of simulated frequency responses of two port S-parameters for a wide-band diversity antenna arrangement according to the further embodiment of the invention. The antenna has been tuned to cover the GSM1800, GSM1900, and UMTS frequencies (1.71 GHz–2.17 GHz). A value for the return loss has been set, for example to $L_{retn} \geq 6$ dB. The lower patch of the antenna is positioned, e.g. on a 0.8 mm-thick high-quality microwave substrate (not shown in the example of FIG. 7). A graph (800) contains x-axis denoting frequency in GHz units and y-axis denoting S parameter in dB units. A curve (801) illustrates the reflection coefficients for the antennas ($S_{11}$ and $S_{22}$ parameters), and a curve (802) illustrates the transmission coefficients between the antennas ($S_{21}$ and $S_{12}$ parameters) for the embodied invention. A graph (803) illustrates a Smith's diagram for the embodied invention containing the corresponding curves. Circles (804) and (805) illustrate the S parameter magnitudes of –6 dB and –10 dB, respectively, for the embodied invention.

Figure 9:
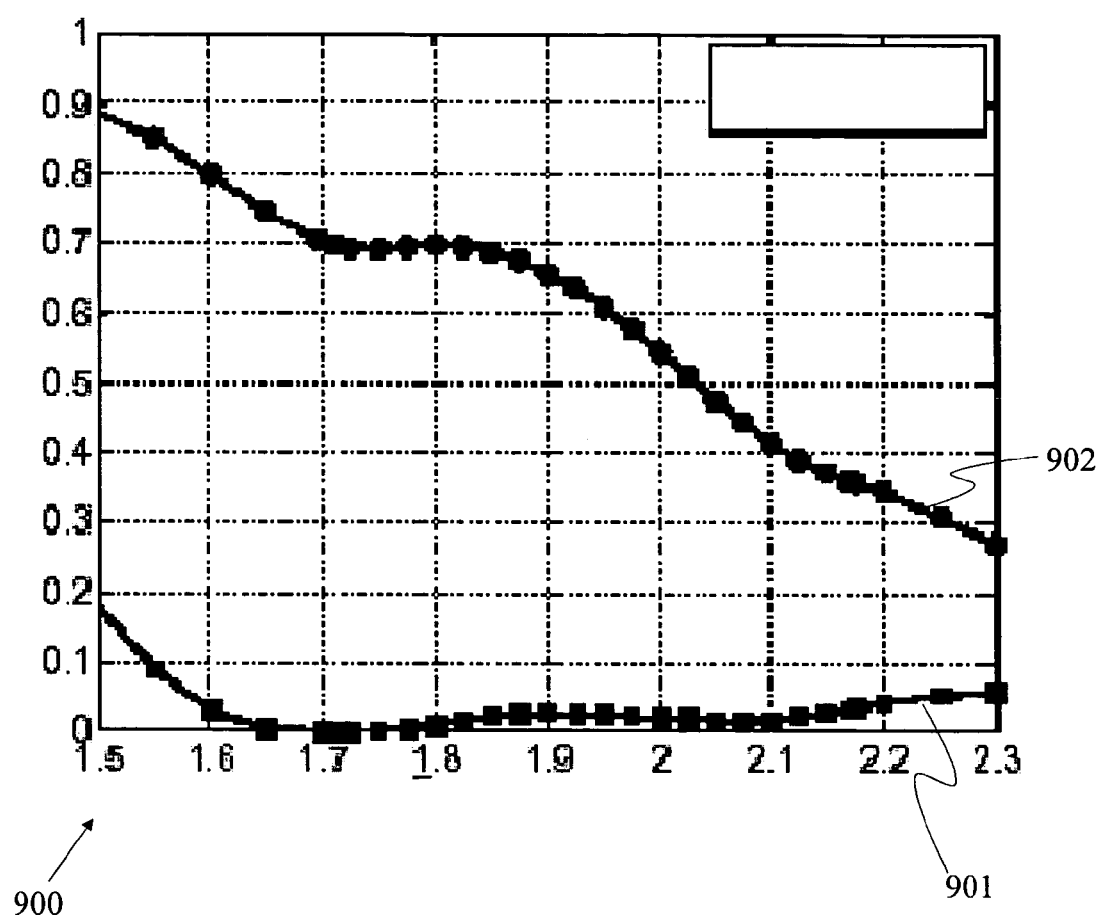
FIG. 9 illustrates an example of calculated envelope correlation coefficients for a wide-band diversity antenna arrangement according to a further embodied invention.

FIG. 9 illustrates an example of calculated envelope correlation coefficients for a wide-band diversity antenna arrangement according to the further embodied invention. A graph (900) has x-axis illustrating frequency in GHz units and y-axis illustrating envelope correction coefficient $\rho_e$. A curve with boxes (901) in the graph (900) illustrates a Uniform distribution calculation. A curve with circles (902) illustrates a Gaussian distribution. A very low correlation is again obtained with the Uniform distribution. With the Gaussian distribution, the correlation coefficient is below 0.7 over the frequency range from 1.71 GHz to 2.17 GHz. Decreasing X from 9 dB to 0 dB, decreases the maximum correlation coefficient again from 0.7 to 0.1. The correlation characteristics of the example of FIG. 9 are similar to those of FIG. 1 and FIG. 3, but, preferably, the bandwidth of the example of FIG. 9 can be twice as wide.

It is also possible to tune the embodied antenna arrangement to cover the frequencies, for example, at least from 2 GHz to 2.8 GHz ($L_{retn}>6$ dB) with similar correlation characteristics.

Figure 10:
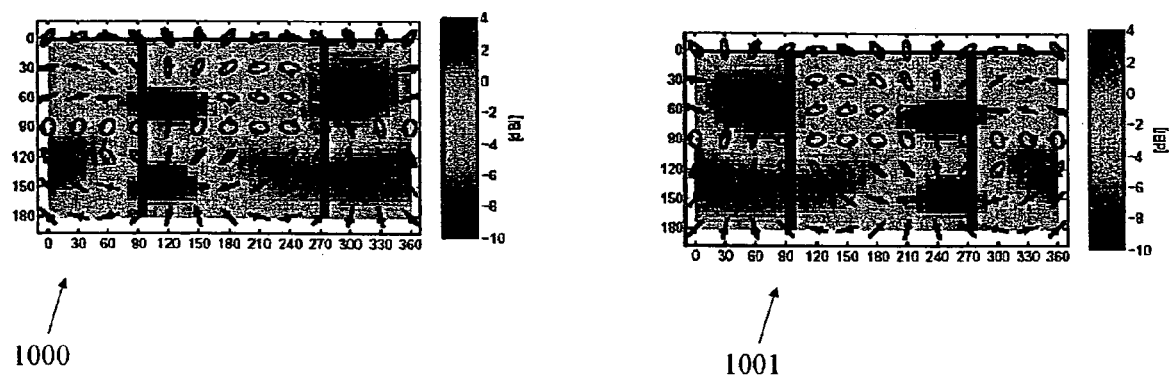
FIG. 10 illustrates an example of simulated polarization ellipses and total realized gain for a wide-band diversity antenna arrangement according to a further embodied invention.
Figure 11A:
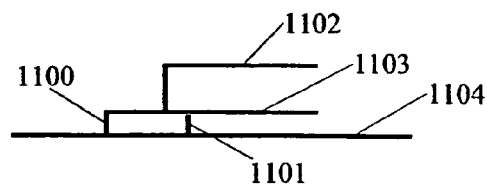
FIGS. 11a–h show some of various ways to implement the wide-band antenna structure of the further embodiments of the invention.
Figure 11B:
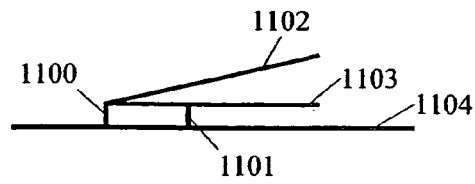
Figure 11C:
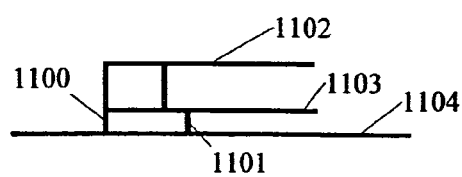
Figure 11D:
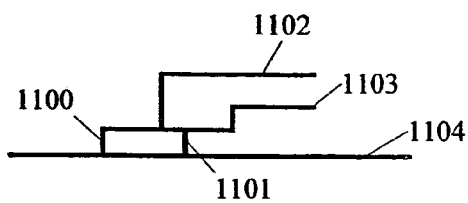
Figure 11E:
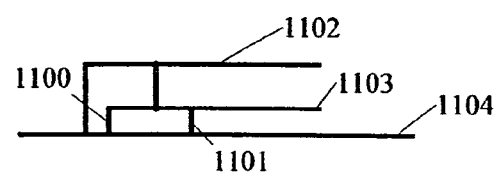
Figure 11F:
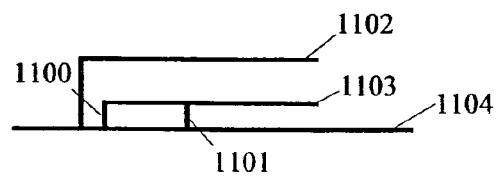
Figure 11G:
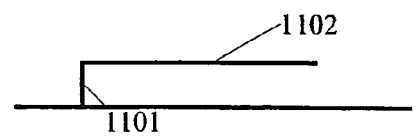
Figure 11H:
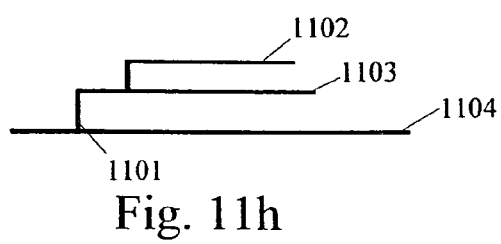

FIG. 10 illustrates an example of simulated polarization ellipses and total realized gain for a wide-band diversity antenna arrangement according to the further embodied invention. FIG. 10 shows simulated polarization ellipses plotted on top of the total realized gain (realized $G_\theta+G_\phi$, including reflection loss) for the embodied wide-band diversity antenna arrangement at 1.95 GHz. The patterns and the polarization state of the antenna at this frequency are quite similar to those of the example of FIG. 1 and FIG. 5 at 2.05 GHz (FIGS. 6a and 6b). X-axes illustrate $\phi$ in degrees and y-axes illustrate $\theta$ in degree units.

The diversity performance of the embodied wide-band diversity antenna arrangement can be fairly comparable to those of the examples of FIGS. 1 and 3. Advantageously, the usable bandwidth can be over twice as wide.

It is clear that the above-described antenna elements and diversity arrangements can be combined in different ways and positioned at different places on a mobile phone like terminal chassis or other terminal chassis within the inventive idea described. For example, one or both of the antenna elements shown in FIGS. 3 and 7 can be moved to any of the free corners or even to the center of the chassis. Alternatively, the antenna elements can exchange places so that short circuits are in the corners and open ends closer to each other. It is also possible to add either a separate lower band (e.g. 900 MHz) antenna element to the arrangement or modify one or both of the described diversity antenna elements to include an integrated lower band element and thereby create a multi-band diversity antenna arrangement. The is not necessarily limited to the lower band but can operate at a different frequency.

Capacitive loads can be added to any of the antenna elements. They should be added preferably to locations where the electric field intensity is perhaps the highest, but also other locations are possible. Inductive loads can also be added to any of the antenna elements, for example, to the short-circuiting entity. Inductive loads should be added preferably to locations where the surface current is perhaps the strongest, such as the connections between the conductive elements and ground (i.e. short-circuiting entity), but also other locations are possible. Capacitive loads can be realised by bending the open end of antenna element towards the ground plane. Inductive loading can be realized by making the ground connection narrower or by adding slots or by meandering, for example.

Any of the antenna elements and the antenna arrangement to some extent can be made of unitary metal part. For example, the wide-band antenna arrangement, where at least one of the antennas, including the short circuit, feed, lower strips, upper strips, and the strip connecting the lower and the upper strips, is formed from unitary metal part. The whole structure can be etched or cut, for example, from tin sheet of metal. The planar sections as well as the L-shape can be achieved by folding. There can perhaps be substrates between the ground and the lower strips. There can also be a dielectric between the strips. Furthermore, the antenna can be supported by a dielectric (plastic) frame.

In some embodiments of the invention one element can be of the type described in the example of FIG. 3 and one of the type described in the example of FIG. 7 perhaps.

As said, the general ground plane element can have different shapes and forms. In some embodiments the general ground plane of the antenna can be of a complex shape, e.g. the PCB can contain several EMI-shield cans. Therefore, the distance of the antenna element(s) to ground varies. The distance from the antenna element to the ground also vary for other reasons. For example, the first conductive element of the antenna element may be directly connected to the ground and the distance from ground to the conductive elements may increase continuously or stepwise as in the example of FIG. 7 as we move towards the open end of the second conductive element.

In yet some embodiments, the chassis of a mobile phone can comprise the ground traces of the printed circuit board (PCB), the metal covers of electromagnetic-interference (EMI) shields, and other possible metal structures that are connected to these. The chassis can act as the generally planar ground plane or counterweight for the antennas.

In yet some embodiments, the first and second conductive elements of the antenna can be of curved elements because the chassis may have strongly rounded corners. The conductive elements of the antenna can also be ellipsoidal. The curved elements have approximately the same performance as the L-shaped ones.

FIGS. 11a–f show some of various exemplary ways to implement the wide-band antenna structure. For the sake of clarity the antenna feed (1101), the short circuit (1100) or the like entity for electrical couplings, the L shaped (1102) or the like radiating element, the second L shaped (1103) or the like radiating element for widening the bandwidth, and the ground element (1104) are depicted in the FIGS. 11a to h.

Figure 12A:
FIGS. 12a–d illustrates yet some of various ways to implement the antenna structure of the further embodiments of the invention.
Figure 12B:
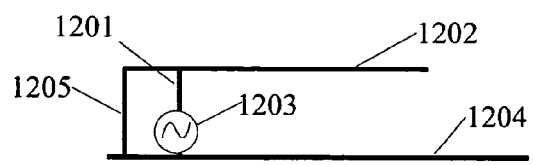
Figure 12C:
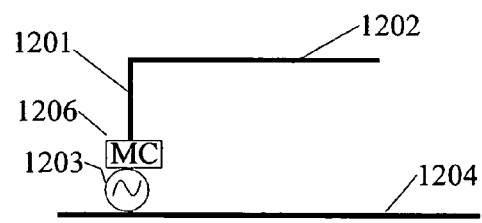
Figure 12D:
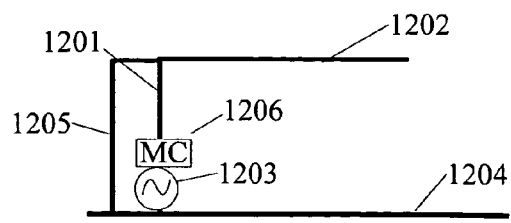

FIGS. 12a–d illustrate yet some various ways to implement the antenna structure in accordance with some further embodiments of the invention. For the sake of clarity the leg portion (1201) or the like, the L shaped element (1202) or the like, the generator (1203) or the like, the short circuit (1205) or the like entity, the matching circuit (1206), and the ground (1204) are depicted in the FIGS. 12a to d. The matching circuit (1204) can match one resonance. The matching circuit can also generate and match several resonances, which are tuned closed to each other, thereby widening the bandwidth of the antenna. The matching circuit (1204) can also match several resonances in such a way the several resonances are situated far enough from each other, thereby establishing a multi-frequency antenna. Different branches can also have different matching circuits (1204). As can be seen in FIG. 12a the leg portion (1201) containing the feed arrangement is in serial coupling with the generator (1203). In FIG. 12b, the leg portion (1201) containing the feed arrangement is in serial coupling with the generator (1203), and they both are in parallel coupling with the short-circuit (1205). In FIG. 12c, the leg portion (1201) containing the feed arrangement is in serial coupling with the generator (1203) and with the matching circuit (1206). In FIG. 12d, the branch of FIG. 12c is in parallel coupling with the short-circuit (1205).

A matching circuit can be completely passive, or it can comprise active components such as switches, variable capacitors and/or transistors. Connecting a matching circuit in series with the antenna feed is not the only possible solution; it is also possible to couple a matching circuit between some part(s) of the L shaped element and the ground. Such a matching circuit connected in parallel with the antenna feed can utilise galvanic and/or electromagnetic coupling to the L shaped element and/or the ground. In a physical implementation it is possible to build the matching circuit onto the PCB or integrate a matching circuit with the antenna structure.

Ramifications and Scope

Although the description above contains many specifics, these are merely provided to illustrate the invention and should not be construed as limitations of the invention's scope. Thus it will be apparent to those skilled in the art that various modifications and variations can be made in the arrangements and processes of the present invention without departing from the spirit or scope of the invention.

What is claimed is:

1. A diversity antenna arrangement for a mobile station having a general ground element, the diversity antenna arrangement including at least a pair of antenna elements, each antenna element comprising:

a first elongated conductive element;
a leg portion coupled to the first elongated conductive element, the leg portion containing a feed arrangement for feeding the antenna element against the ground element; and
a second elongated conductive element;
the first and the second elongated conductive elements being transversal to each other and in contact with each other;
wherein said pair of the antenna elements is arranged so that the feed arrangements of said antenna elements are closer to each other than the second elongated conductive elements of the antenna elements.

2. A diversity antenna arrangement according to claim 1, further comprising a short-circuiting entity coupled between the first elongated conductive element and the general ground element.

3. A diversity antenna arrangement according to claim 2, wherein the first elongated conductive element, the leg portion, the second elongated conductive element, and the short-circuiting entity are arranged to be formed from a unitary metal part.

4. A diversity antenna arrangement according to claim 2, wherein inductive loads are added to the short-circuiting entity.

5. A diversity antenna arrangement according to claim 2, wherein the resonant frequency of each antenna element is substantially the same.

6. A diversity antenna arrangement according to claim 1, further comprising a matching circuit serially coupled with the feed arrangement.

7. A diversity antenna arrangement according to claim 1, further comprising a matching circuit parallelly coupled with the feed arrangement.

8. A diversity antenna arrangement according to claim 1, further comprising a matching circuit integrated into a common structure with the diversity antenna arrangement.

9. A diversity antenna arrangement according to claim 1, wherein the first elongated conductive element, the leg portion, and the second elongated conductive element are arranged to be formed from a unitary metal part.

10. A diversity antenna arrangement according to claim 1, wherein the first elongated conductive element and the second elongated conductive element are adapted to be in contact at an end of the each elongated conductive element.

11. A diversity antenna arrangement according to claim 1, wherein the first elongated conductive element and the second elongated conductive element are adapted to form a generally L-shaped unitary metal element.

12. A diversity antenna arrangement according to claim 1, wherein the first conductive element and the second conductive element are adapted to form a generally semi-ellipsoidal unitary metal element.

13. A diversity antenna arrangement according to claim 1, wherein the antenna elements are arranged to be positioned as far away from each other as a form of the general ground element allows.

14. A diversity antenna arrangement according to claim 1, wherein the antenna elements are arranged to be positioned as far away from each other as a metal chassis of the mobile station allows.

15. A diversity antenna arrangement according to claim 1, wherein the antenna elements are arranged to be positioned at substantial corners of the general ground element.

16. A diversity antenna arrangement according to claim 1, wherein the antenna element is at least partly outside of the general ground element.

17. A diversity antenna arrangement according to claim 1, wherein said diversity antenna arrangement comprises a compact diversity antenna arrangement suitable to fit for a cellular mobile phone.

18. A diversity antenna arrangement according to claim 1, wherein said pair of the antenna elements is further arranged so that said second elongated conductive elements are generally parallel to each other.

19. A diversity antenna arrangement for a mobile station having a general ground element, the diversity antenna arrangement including at least a pair of antenna elements, each antenna element comprising:
a first elongated conductive element;
a leg portion coupled to the first elongated conductive element, the leg portion containing a feed arrangement for feeding the antenna element against the ground element; and
a second elongated conductive element;
the first and the second elongated conductive elements being transversal to each other and in contact with each other;
wherein the resonant frequency of each antenna element is substantially the same; and
wherein an open end of the second elongated conductive element is adapted to be bent generally towards the ground element.

20. A diversity antenna arrangement for a mobile station having a general ground element, the diversity antenna arrangement including at least a pair of antenna elements, each antenna element comprising:
a first elongated conductive element;
a leg portion coupled to the first elongated conductive element, the leg portion containing a feed arrangement for feeding the antenna element against the ground element; and
a second elongated conductive element;
the first and the second elongated conductive elements being transversal to each other and in contact with each other;
wherein the resonant frequency of each antenna element is substantially the same; and
wherein the antenna element further comprising:
a third elongated conductive element; and
a fourth elongated conductive element;
the third and fourth elongated conductive element being transversal to each other, in contact with each other, and electrically coupled with any of said elements.

21. A diversity antenna arrangement according to claim 20, wherein said electrical coupling comprises at least one of a direct galvanic coupling, and electromagnetic field coupling.

22. A diversity antenna arrangement according to claim 20, further comprising a short-circuiting entity coupled between the first elongated conductive element and the general ground element.

23. A diversity antenna arrangement according to claim 22, wherein the first, the second, the third and the fourth elongated conductive elements, the leg portion, and the short-circuiting entity are arranged to be formed from a unitary metal part.

24. A diversity antenna arrangement according to claim 22, wherein inductive loads are added to the short-circuiting entity.

25. A diversity antenna arrangement according to claim 20, wherein the third and fourth elongated conductive elements are short-circuited separately from the first and the second elongated conductive elements.

26. A diversity antenna arrangement according to claim 20, wherein the elongated conductive elements are adapted to form a stacked structure.

27. A diversity antenna arrangement according to claim 20, wherein the elongated conductive elements are adapted to act as parasitic resonators for widening an operational radio frequency bandwidth of the antenna element.

28. A diversity antenna arrangement according to claim 20, wherein the first, the second, the third and the fourth elongated conductive element, and the leg portion are arranged to be formed from a unitary metal part.

29. A diversity antenna arrangement according to claim 20, wherein unitary metal element formed by the first and the second elements is coupled by at least one connection to unitary metal element formed by the third and the fourth elements.

30. A diversity antenna arrangement according to claim 20, further comprising at least one additional antenna element operating in at least one different frequency band integrated with the diversity antenna arrangement to create a multi-band diversity antenna arrangement.

31. A diversity antenna arrangement according to claim 20, further comprising separate at least one additional antenna element operating in at least one different frequency band to create multi-band antenna arrangement with diversity function.

32. A diversity antenna arrangement for a mobile station having a general ground element, the diversity antenna arrangement including at least a pair of antenna elements, each antenna element comprising:
a first elongated conductive element;
a leg portion coupled to the first elongated conductive element, the leg portion containing a feed arrangement for feeding the antenna element against the ground element; and
a second elongated conductive element;
the first and the second elongated conductive elements being transversal to each other and in contact with each other;
wherein the resonant frequency of each antenna element is substantially the same; and
further comprising at least one additional antenna element operating in at least one different frequency band integrated with the diversity antenna arrangement to create a multi-band diversity antenna arrangement.

33. A diversity antenna arrangement for a mobile station having a general ground element, the diversity antenna arrangement including at least a pair of antenna elements, each antenna element comprising:
a first elongated conductive element;
a leg portion coupled to the first elongated conductive element, the leg portion containing a feed arrangement for feeding the antenna element against the ground element; and
a second elongated conductive element;
the first and the second elongated conductive elements being transversal to each other and in contact with each other;
wherein the resonant frequency of each antenna element is substantially the same; and
further comprising separate at least one additional antenna element operating in at least one different frequency band to create multi-band antenna arrangement with diversity function.

34. A diversity antenna system for a mobile station having a general ground element, the diversity antenna system including at least a pair of antenna elements, each antenna element comprising:
a generally L-shaped radiating element formed by a first conductive element and a second conductive element; and
a leg portion coupled to the first conductive element of the generally L-shaped radiating element, the leg portion containing a feed arrangement for feeding the antenna element against the ground element, wherein the L-shaped radiating elements are positioned relative to each other so that the feed arrangements of said antenna elements are closer to each other than the second conductive elements of the antenna elements.

35. A diversity antenna system for a mobile station having a general ground element, comprising:
at least a pair of planar inverted F antennas (PIFAs), for each PIFA, metallization is adapted to be removed from a generally center region of the PIFA in such a way that two current paths can be formed on generally edges of the PIFA, and further one of the formed current path is adapted to be removed by a removal of a corresponding metallization of said current path.

36. A method for manufacturing a diversity antenna arrangement for a mobile station, the diversity antenna arrangement comprising a general ground element and at least a pair of antenna elements, the method comprising the steps of:
obtaining at least a pair of planar inverted F antennas (PIFAs), for each PIFA, removing metallization from a generally center region of the PIFA in such a way that two current paths can be formed on generally edges of the PIFA, and
removing one of the formed current paths by a removal of a corresponding metallization of said current path.

37. A method of operating a mobile station for a mobile communications network, the mobile station comprising a pair of operational states and a general ground element, the method comprising the steps of:
providing a pair of antenna elements, each antenna element comprising:
a generally L-shaped radiating element formed by a first conductive element and a second conductive element; and a general conductive leg portion being operatively coupled to the first conductive element of the generally L-shaped radiating element, the leg portion containing a feed arrangement for feeding the antenna element against the ground element, wherein the L-shaped radiating elements are positioned relative to each other so that the feed arrangements of said antenna elements are closer to each other than the second conductive elements of the antenna elements and, wherein the pair of antenna elements are aligned so that directions are substantially orthogonal;
operating the mobile station in a first operational state wherein in a given direction one of the pair of antenna elements is substantively maximally responsive to a certain polarization; and
operating the mobile station in a second operational state wherein in said direction the other of the pair of antenna elements is substantively maximally responsive to a polarization that is sufficiently different to that of the first antenna element.

* * * * *